United States Patent [19]

Walker et al.

[11] 4,314,190
[45] Feb. 2, 1982

[54] CONTROLLED CURRENT INVERTER WITH ANGLE COMMAND LIMIT

[75] Inventors: Loren H. Walker, Salem; John H. Cutler, Roanoke, both of Va.

[73] Assignee: General Electric Company, Salem, Va.

[21] Appl. No.: 142,657

[22] Filed: Apr. 22, 1980

[51] Int. Cl.³ ............................ H02P 5/40; H02P 7/42
[52] U.S. Cl. .................................... 318/798; 318/803; 318/808
[58] Field of Search ............... 318/801, 802, 803, 798, 318/807–811; 363/35

[56] References Cited

U.S. PATENT DOCUMENTS

| | | | |
|---|---|---|---|
| 3,863,134 | 1/1975 | Pollard | 363/35 |
| 4,160,940 | 7/1979 | Wolf | 318/803 |
| 4,230,979 | 10/1980 | Espelage et al. | 318/802 |

OTHER PUBLICATIONS

Phillips, K. P., "Current-Source Converter For AC Motor Drives," Transactions on Industry Applications, Nov./Dec. 1972.

*Primary Examiner*—David Smith, Jr.
*Attorney, Agent, or Firm*—Arnold E. Renner; James H. Beusse

[57] ABSTRACT

A controlled current inverter system forms the basis of an AC motor drive system for furnishing the motor load 18 with a variable frequency, variable magnitude AC current from an inverter 14 which is supplied from a variable DC current source such as a converter 12 by way of a DC link including an inductor 17. Motor speed and torque are controlled through the control of motor current $I_M$ and angle $\theta$, which is the angle formed between vectors designating motor current and flux through first and second control signal channels 39 and 59 coupled to the DC source 12 and the inverter 14, respectively. A control function of this angle, defined in terms of both method and apparatus, is implemented by means 61 and 63 which limits this angle to predetermined values for relatively low levels of motor current, for example, values of current corresponding to the current required for maintaining a minimum amount of motor flux. Thus, if actual motor current becomes lower than the anticipated motor current, the angle $\theta$ will be limited in a manner which maintains a minimum motor flux.

24 Claims, 6 Drawing Figures

CONTROLLED CURRENT INVERTER WITH ANGLE COMMAND LIMIT

CROSS REFERENCE TO RELATED APPLICATION

The subject invention is related to U.S. Pat. No. 4,230,979 entitled, "Controlled Current Inverter and Motor Control System", issued Oct. 28, 1980 in the names of Paul M. Espelage, et al., which application is also assigned to the assignee of this invention.

BACKGROUND OF THE INVENTION

The present invention relates generally to power conversion systems wherein the torque of an AC motor load is controlled through the control of the motor current and flux and more particularly to a method and apparatus which limits the flux angle command signal, over a predetermined operating range, as a function of motor current.

In the past, DC (direct current) motors have been used for operation over a wide speed range as desired. More recently, however, AC motors have been finding greater application in variable speed and drive applications. This is due in a large measure to the inherent ruggedness of an AC induction motor, for example, which exhibits a reduced maintenance problem due to the lack of brushes which makes AC motors particularly desirable for certain applications. Notwithstanding this desirable feature of an AC induction motor, certain problems associated with its use exist particularly when the motor is supplied by power from a variable frequency inverter (DC to AC) which in turn is fed DC power from a converter (AC to DC).

Where, for example, the converter/inverter circuits are implemented by means of phase controlled thyristors connected in bridge circuit configurations, one must consider the commutation delay existing while the current transfer is affected from a previously conducting thyristor to a newly fired thyristor. Normally this overlap is from 10 to 30 electrical degrees. In supplying an AC motor, such as an induction motor at high motor speed, it may take as long as 120 electrical degrees between the firing of a new thyristor and the transfer of the current to the motor phase to which the thyristor is connected. As such, the use of an open loop system in which thyristors are fired as a result of a pre-established schedule is not particularly applicable to the desired type of operation and instead a closed loop system in which thyristors, for example, are fired as a function of the existing angle $\theta$ between the air gap flux and the motor current, commonly referred to as the air gap power factor, represents a more desirable mode of operation.

In the above cross-referenced related U.S. Pat. No. 4,230,979, which is specifically incorporated herein by reference, there is disclosed a controlled current inverter system for supplying an AC load such as an induction motor with an AC current of variable magnitude and variable frequency. The system described therein employs a variable DC power source which is connected to a variable frequency DC to AC inverter, preferably by way of a DC link including an inductor. Means are included to develop signals representing the instantaneous electrical torque of the AC motor and the instantaneous air gap power factor. The electrical torque signal and the angle signal are then utilized to control the DC current in the link and the firing angle of the inverter with respect to the motor flux such that the angle $\theta$ is controlled and maintained substantially constant over its prescribed operating range.

SUMMARY OF THE INVENTION

It is therefore an object of the present invention to provide an improved power conversion system particularly as applied to the operation of an AC motor.

Another object is to provide an improved AC motor control and drive system.

A further object is to provide an improved AC motor control and drive system which is operative over a predetermined operating range to restrict the air gap power factor as a function of motor current.

It is yet another object of the present invention to provide an AC motor control and drive system which operates to limit the air gap power factor (angle $\theta$) to predetermined values should the motor current decrease to levels approaching the value of the current required to maintain a minimum flux and thereby prevent motor flux from collapsing on sudden changes of torque reference.

Briefly, these and other objects are accomplished through the provision of an improved method and apparatus for implementing an AC motor drive system including an AC to DC converter and a DC to AC variable frequency inverter. Both the converter and inverter are controlled by means of a closed loop feedback system having a current control channel controlling the output of the converter and an angle $\theta$ control channel controlling the inverter output frequency. The improved system includes means for limiting the air gap power factor or angle $\theta$ as a function of motor current and more particularly the angle command is limited to values necessary to maintain a minimum air gap flux as the motor current decreases. At higher motor currents, the limit of angle command is increased through a transition zone following which the command is permitted to achieve any value scheduled by the system for optimum operation over its normal operating range. In order to implement this operating characteristic, a multi-level signal clamp is included in the angle $\theta$ control channel with the clamp being controlled by means of a function generator which is responsive to the magnitude of the instantaneous motor current to provide a varying clamp level signal within a predetermined range of motor current. Such an implementation limits the angle reference signal in angle $\theta$ control channel when motor current is relatively low to prevent the motor flux from collapsing on sudden changes in torque reference.

BRIEF DESCRIPTION OF THE DRAWINGS

While the present invention is particularly defined in both method and apparatus claims annexed to and forming a part of the specification, a better understanding can be had from the following description taken in conjunction with the accompanying drawings in which:

DETAILED DESCRIPTION

Figure 1:
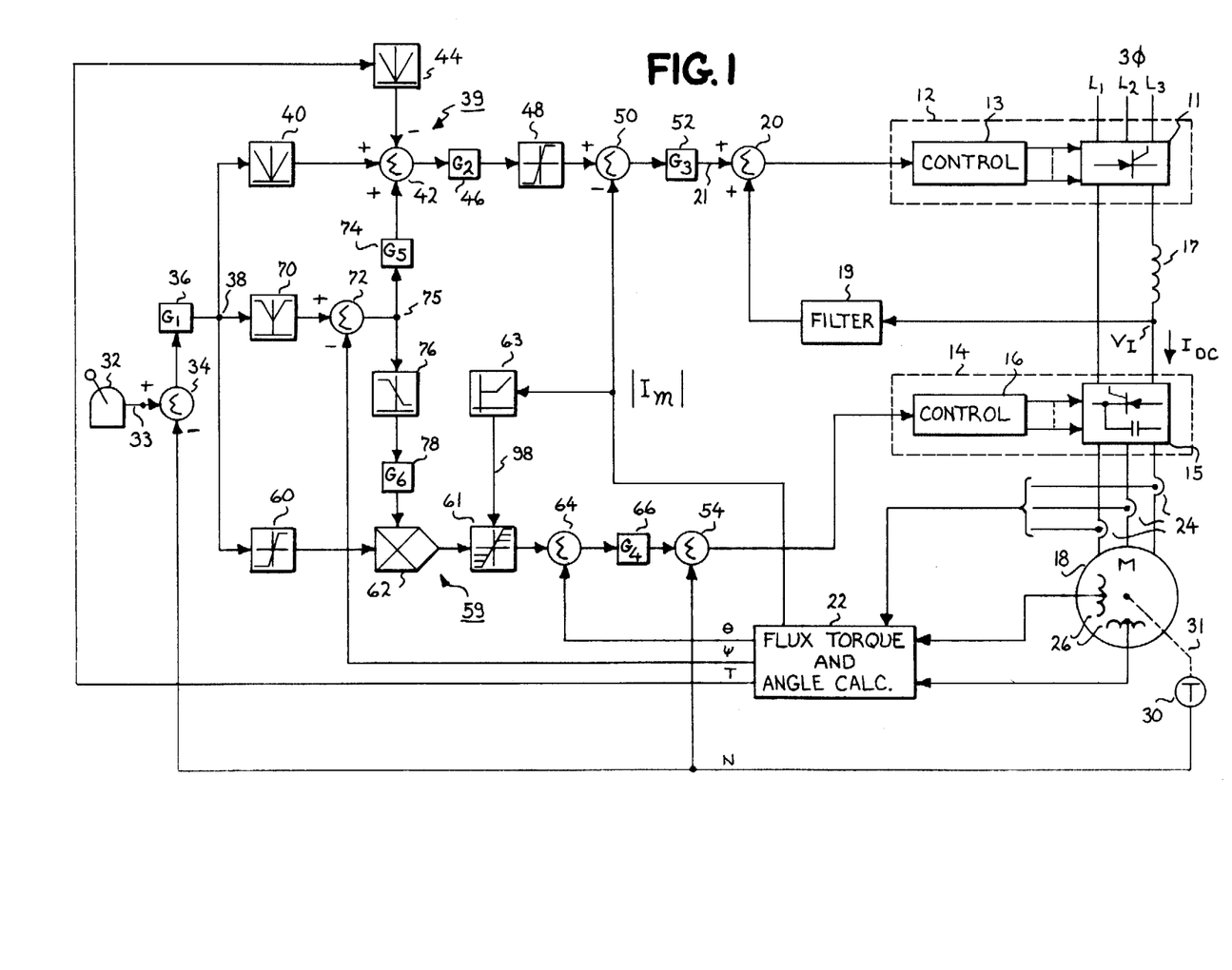
FIG. 1 is a schematic block diagram illustrating the present invention in its preferred embodiment.

Referring now to FIG. 1 which illustrates the present invention as it relates to an induction motor drive system, it is seen that the present invention centers around a controlled current inverter system such as shown and described in the above cross-referenced related, U.S. Pat. No. 4,230,979. The system includes a source of variable DC current 12 which, in FIG. 1 is shown as a converter unit 11 under the control of a suitable control means 13. A current ($I_{DC}$) is supplied from the source 12 by means of a DC link circuit, including a suitable filter such as an inductor 17 for smoothing the DC current from the source 12 to a suitable inverter circuit 14 including a converter unit 15 under the control of a control means 16. The output of the inverter circuit 14 is supplied to a load shown in FIG. 1 comprising an AC induction motor 18.

The DC source 12 can be any one of a variety of forms such as, for example, a DC chopper whose input terminals are coupled to an uncontrolled DC source. In such a case the control can be of the time ratio type. The source 12 can, when desirable, include some other means for varying the current emanating from a DC source. More commonly, however, the source is of the form illustrated in FIG. 1 in which the conversion unit is a phase controlled multi-legged bridge, for example a six-thyristor bridge, which has its input connected to a three phase source as represented by terminals $L_1$, $L_2$, $L_3$. In this situation, the control can be of that known type, which is synchronized with the line voltage and which under control of an input signal, varies the output by varying the firing angles of the bridge rectifiers in response to an input signal to thereby vary the source's DC output. A feedback path from the inverter input voltage ($V_I$) is provided to the DC source by way of a filter 19 and a summing junction 20. This is a positive feedback of unity gain. Ignoring for the moment any other inputs to the summing junction 20, this feedback will cause the output voltage of unit 12 to match that $V_I$ reflected by the inverter 14. With no DC voltage across inductor 17, the inductor will tend to maintain a constant current at any voltage level set by $V_I$. If a second signal is injected into the summing junction 20, i.e. at terminal 21, this will tend to cause a voltage across inductor 17 which is proportional to this second signal. This will cause a rate-of-change of current ($I_{DC}$) in inductor 17 which is proportional to the signal at terminal 21. Thus, the positive feedback signal through filter 19 has tended to convert DC voltage source 12 into a DC current source responsive to input at terminal 21; that is, as shown in FIG. 1, the output of an amplifier 52 to be later described.

The inverter circuit 14 includes a suitable conversion unit 15 which may also take any suitable form but which most commonly today would also be a six-thyristor bridge as known in the art. The operating frequency of the unit 15 is shown under the control of a control means 16. One well-known implementation for the control means includes a voltage controlled oscillator feeding a ring counter the output signals of which are used to initiate the firing of the thyristors of the bridge. In this well-known type of control, the magnitude of the input signal to the voltage controlled oscillator controls the inverter output frequency. As is understood, the instantaneous air gap power factor; i.e., the angle ($\theta$) existing between the air gap flux and motor current of the motor load can be varied by changing the inverter output frequency since any difference between the frequency of motor back EMF (flux) and the frequency of inverter current will appear as a rate of change of phase angle of current with respect to flux.

In the overall control of the present invention, four signals find primary application. These signals are, respectively, proportional to the gap flux ($\psi$), the electrical torque (T), the angle between the motor flux and the motor current ($\theta$) and the actual motor speed (N). The three signals $\psi$, T and $\theta$ are derived by suitable calculations in response to motor operating parameters and are shown emanating from block 22 in FIG. 1. The exact circuitry of the block 22 is not of critical importance to the present invention but it may, for example, be that which is shown and described in U.S. Pat. No. 4,088,934 which issued on May 9, 1978 in the names of J. D. D'Atre, A. B. Plunkett and T. A. Lipo entitled, "Means for Stabilizing A.C. Electric Motor Drive System," and which is assigned to the assignee of the present invention. This patent is specifically incorporated herein by reference. In accordance with the description in U.S. Pat. No. 4,088,934, the block 22 develops the $\psi$, T and $\theta$ signals as a function of inputs representing motor parameters including the motor current $I_M$ which is shown in FIG. 1 as being derived from three current sensors 24 associated with the lines connecting the inverter and the motor 18. The other inputs to block 22 are signals proportional to motor flux which are shown as being derived from a pair of flux coils 26 associated with the motor. As illustrated in FIG. 1, in addition to the $\psi$, T and $\theta$ signals, block 22 outputs a signal $|I_M|$ proportional to the absolute motor current. This signal represents nothing more than the absolute value of the rectified and combined individual values of the signals derived from the three current sensors 24. A tachometer 30 is shown associated with the motor 18 as indicated by the dashed line 31 and serves as an exemplary means of providing the fourth or motor speed signal N. Tachometer 30 could be any of those well known in the art, for example, a DC tachometer which will provide a steady-state output voltage signal proportional to the actual speed of the motor.

The basic control function of the present invention has its origin with the establishment of a torque reference signal. To establish this signal in accordance with the illustration in FIG. 1, there is shown a suitable means such as an operator settable rheostat 32 which will output a signal to a point 33 which is proportional to a desired motor speed; i.e., a speed reference signal. The speed signal N from the tachometer 30 is combined with the speed reference signal from the device 32 in a summing junction 34 such that the output of junction 34 will be a signal proportional to the difference between the desired and the actual motor speed and is defined as the speed error signal. This speed error signal is applied to a suitable amplifier 36 having a transfer function appropriate for speed regulation.

The output of amplifier 36 at point 38 is a signal which is designated the torque command or reference signal. That this actually is a signal proportional to a desired change in torque is readily apparent when one considers that, if the speed of the motor differs from that which is desired, to get to the desired speed a change in torque will be required.

It will be remembered from the previous discussion that the purpose of the direct current source; i.e., the converter 12, was to provide a DC current of varying magnitude in accordance with the desired torque. The top or current control channel 39 will, therefore, be discussed first. Since the present invention contemplates motor operation in both the forward and reverse directions, and since in either case the torque reference signal at point 38 could be of either relative polarity, this signal is first applied to an absolute magnitude circuit 40, the output of which forms one input to a summing junction 42. A second input to junction 42 is the output of a second absolute magnitude circuit 44 which has as its input the signal (T) proportional to the actual instantaneous torque such that, ignoring for the present the third input to the summing junction 42, the output of junction 42 as applied to a suitable amplifier 46 is a signal proportional to the difference between the torque reference signal and the actual instantaneous torque. The output of amplifier 46 is applied to a limiting circuit or limiter 48 which serves to prevent exceptionally large excursions from occurring in short periods of time and thus limits the rates of which change can be effected. The output of limiter 48 is applied to a summing junction 50 which has as a second input a signal proportional to the absolute magnitude of the motor current $|I_M|$ from block 22. The $|I_M|$ signal, coupled to summing junction 50 serves as a negative feedback voltage in a stabilizing direction so that when a large torque is called for, the torque error may be satisfied transiently by a large current rather than a large torque until the actual torque can build up. As such, the output from the summing junction 50 is supplied to a suitable amplifier 52 the output of which serves as an input to terminal 21 of the summing junction 20 previously discussed. Since, as previously indicated, a feedback signal of the inverter input voltage $V_I$ by way of the filter 19 causes the current $I_{DC}$ to be controlled by the signal at terminal 21, errors in torque will be corrected through the current control channel including the control means 13 such that when more torque is required a positive voltage will be passed to the control means 13 to effect more current output from the source 12. Conversely, when less torque is required, a negative or less positive signal will be applied to the control 13 thus decreasing the amount of current supplied from the source to the inverter 14.

Next, the lower or angle control channel 59 shown in FIG. 1 will be discussed. This is a control loop which controls the frequency of inverter operation and hence the air gap power factor or angle $\theta$ and is the location where the subject inventive concept resides. Looking at this portion of the system first it is seen that the speed signal N, from tachometer 30, forms a positive feedback which is analogous to the feedback for the DC link voltage to the source 12 by way of the filter 19. That is, the tachometer feeds back a DC signal in a positive sense which in the absence of other inputs to summing junction 54, commands the inverter frequency to remain at the zero slip value. As such, the rest of the lower channel has only to handle signals proportional to slip frequency.

Figure 2:
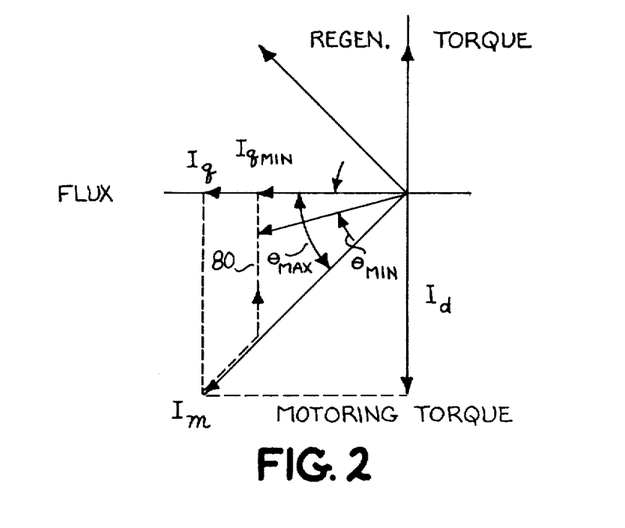
FIG. 2 is a vector diagram helpful in understanding the operation of the present invention.

The angle $\theta$ is shown in FIG. 2 as being the angle formed between the vectors $I_M$ and $I_q$ where $I_M$ designates the motor current and $I_q$ designates that component of motor current which produces air gap flux. $I_d$ represents that portion of the motor current which produces torque. With the foregoing in mind and again considering the angle control channel; i.e., the loop that controls the angle $\theta$, at point 38 the torque command signal is applied to a suitable limiting circuit or limiter 60 which provides, essentially, an output signal of constant magnitude but of varying polarity in accordance with the polarity of the torque reference signal. This output of the limiter 60, an angle reference signal proportional to the desired value of $\theta$, is applied to a multiplier 62 which for the moment may be considered as having a second input of unity such that its output is an exact duplicate of its first input. The output of the multiplier 62 is applied via a variable clamp 61 controlled by an angle command limit function generator 63, which will be considered further as the discussion continues, as one input to a summing junction 64 the other input to which is the angle signal $\theta$ from the block 22. These two signals, the angle reference signal from block 61 and the angle signal from block 22 form a frequency error signal which is applied by way of a suitable amplifier 66 to the summing junction 54, the output of which is a frequency command signal which is applied to the control 16 to thereby control the frequency of the output of the inverter 14. From the preceding, the lower loop is essentially a phase-locked loop which senses an angle error to control the frequency and hence the air gap power factor of the motor.

From the description thus far it is seen that by controlling the current and air gap power factor of the motor 18 a precise and instantaneous control of both torque and flux in the motor is maintained. It is noted, however, that this precise control can only be obtained if the motor characteristics are very constant, linear, and are accurately known such that the desired angle $\theta$ can be calculated very precisely. Since this is not ordinarily the case, the present invention provides a third control loop. This third loop employs the $\psi$ signal from block 22 and functions as a low gain trim to provide modifications to both the current control and angle control channels to assure that the motor flux is at the proper value for each torque level.

Still with reference to FIG. 1, block 70 represents a desired flux program which receives as its input the torque reference signal at point 38. The function of block 70 as disclosed in U.S. Pat. No. 4,230,979 may be achieved by a simple magnitude limited absolute value circuit having an offset such that the output of the block 70 always has some finite value even though the signal at point 38 goes to zero. The output from block 70, which comprises a flux reference signal, is supplied as one input to a summing junction 72 the other input of which is the $\psi$ signal (from block 22) which has a magnitude proportional to the instantaneous value of the motor gap flux. The output from the summing junction 72 is here termed a flux error signal and appears at junction 75. The output from summing junction 72 is applied by way of a suitable amplifier 74 to the summing junction 42 in a positive sense. This positive addition to the torque control channel has the effect that if the instantaneous flux is less than that desired, the addition at summing junction 42 will result in an increase in current to the inverter 14. Conversely if the flux is higher than desired, a smaller current will be supplied to the inverter.

The output of the summing junction 72 is also provided to a simple limiter 76 which is provided with an offset so that with a zero value of the flux error signal at junction 75 the output of the function 76, after being applied through a suitable gain amplifier 78, the output of which serves as an input to the multiplier 62 previously mentioned, is unity. Other values of the flux error signal will result in a multiplication factor of greater or less than unity but always greater than zero being applied to the multiplier 62. The effect of this flux error signal on the angle command is to reduce angle when more flux is needed.

The overall effect of the middle or flux loop as a modifier to the other two loops is essentially as follows. When there is no flux error, there is not effect from the flux loop on the multiplier 62 and, hence, the output of this multiplier is a function of its quiescent gain. When there is a flux error, the path including the limiter 76 and amplifier 78 serves to change the gain of the multiplier 62 to correct that error. At very light motor loads the output of summing junction 42 in the torque regulation loop (upper channel) might be insufficient to maintain predictable control of the flux and the feedback path for the flux error by way of amplifier 74 serves to control this flux level at these light loads by the current control previously mentioned. At near zero torque on the motor the angle program input to multiplier 62 is also near zero. The flux control path through limiter 76 and amplifier 78 cannot control flux in this case since the signal at the output of 78 is multiplied by zero. However, the path of the flux error signal by way of amplifier 74 can act to control flux at substantially no load by controlling motor current. In the heavily loaded condition, by making the gain of amplifier 74 low, its output will be small compared to the torque signals through blocks 40 and 44 so that the flux loop will have little effect on current. Thus, when the motor is loaded the flux error is kept small by the action of path through multiplier 62 and the path by way of amplifier 74 has little effect. When the motor load is light and the flux cannot be controlled through the frequency, the flux error becomes large enough for response through the summing junction 42 in the torque regulation path.

The operation of the system described up to this point corresponds substantially to that disclosed in U.S. Pat. No. 4,230,979. The subject invention, however, includes an additional feature provided by the variable clamp 61 and the function generator 63 which comes into play when the motor current decreases such as during transient conditions when the magnitude of the motor current $I_M$ suddenly decreases to a relatively small value of its rated current. As shown in FIG. 2, a motor current in the second quadrant refers to a regenerating mode of operation where the motor is feeding power back into the line. The third quadrant designates the motoring mode of operation. Under normal conditions, a particular induction motor has a definite relationship between $I_q$ and $I_d$ which will provide the optimum operation of the motor from a current utilization standpoint, and accordingly it is desirable under most operating conditions to run the motor at a constant rated power factor angle $\theta$ when it is loaded. However, it has been found desirable never to allow the flux and accordingly the value of $I_q$ to go to zero, thus preventing the motor flux from collapsing upon sudden change in torque reference. This is partially provided by the flux program block 70; however, the action of the variable clamp 61 and the function generator 63 further limit the angle $\theta$ to a substantially constant predetermined minimum value as the motor current $I_M$ decreases to a level approximating the value of the minimum flux, $I_{qmin}$ (FIG. 2), required for proper operation of the basic control system.

Figure 3:
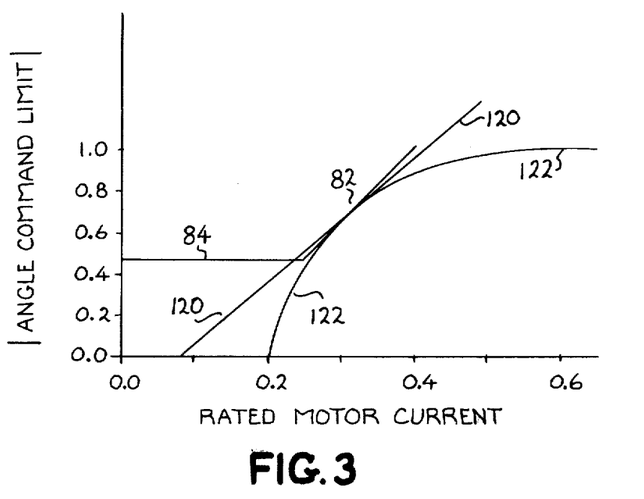
FIG. 3 is a graph illustrative of the desired angle command limit schedule provided by the present invention.

One such characteristic is provided by the angle command limit schedule shown by curve 82-84 in FIG. 3. This curve denotes that in the region beyond 0.4 or 40% of the rated motor current, the angle command is permitted to achieve the value scheduled by the angle program block 60, which typically comprises a constant angle of, for example, 60°. However, as the motor current decreases from the 0.4 rated current value, a linear transition of a variable angle command is effected to a point where the motor current is substantially 0.25 of its rated motor current at which point the angle is clamped to a substantially fixed value. During this linear transition, the angle command decreases the angle $\theta$ from its rated angle corresponding to 1.0 (FIG. 3) to 0.44 of its rated angle, which for a rated angle of 60° (arc cos 0.5) comprises an angle of approximately 26.5° or arc cos 0.9. This linear transition region is denoted by reference 80 in FIG. 2, and reference numeral 82 of FIG. 3. The clamped minimum angle is further designated by $\theta_{min}$ of FIG. 2 and corresponds to the line segment 84 of FIG. 3. Thus the angle command is limited to a relatively small value of rated angle as a function of motor current for relatively low motor current values. Thereafter, at higher motor currents, the limit of angle command is increased to a point where the angle command is permitted to achieve any value scheduled by the angle command function implemented into the system. By restricting the excursion of the angle $\theta$ to values near zero when the motor current is small (for whatever reason the motor current is small), the motor flux level is better controlled since existing motor current will be utilized to maintain flux rather than attempt to produce an increased torque at the expense of flux. Thus the variable clamp 61 comprises a voltage responsive clamp which receives a command voltage from the function generator 63 which in turn is responsive to the absolute value of the instantaneous motor current $|I_M|$ provided from the block 22 to effect the characteristic curve shown in FIG. 3 consisting of line segments 82 and 84.

Figures 4, 5, 6:
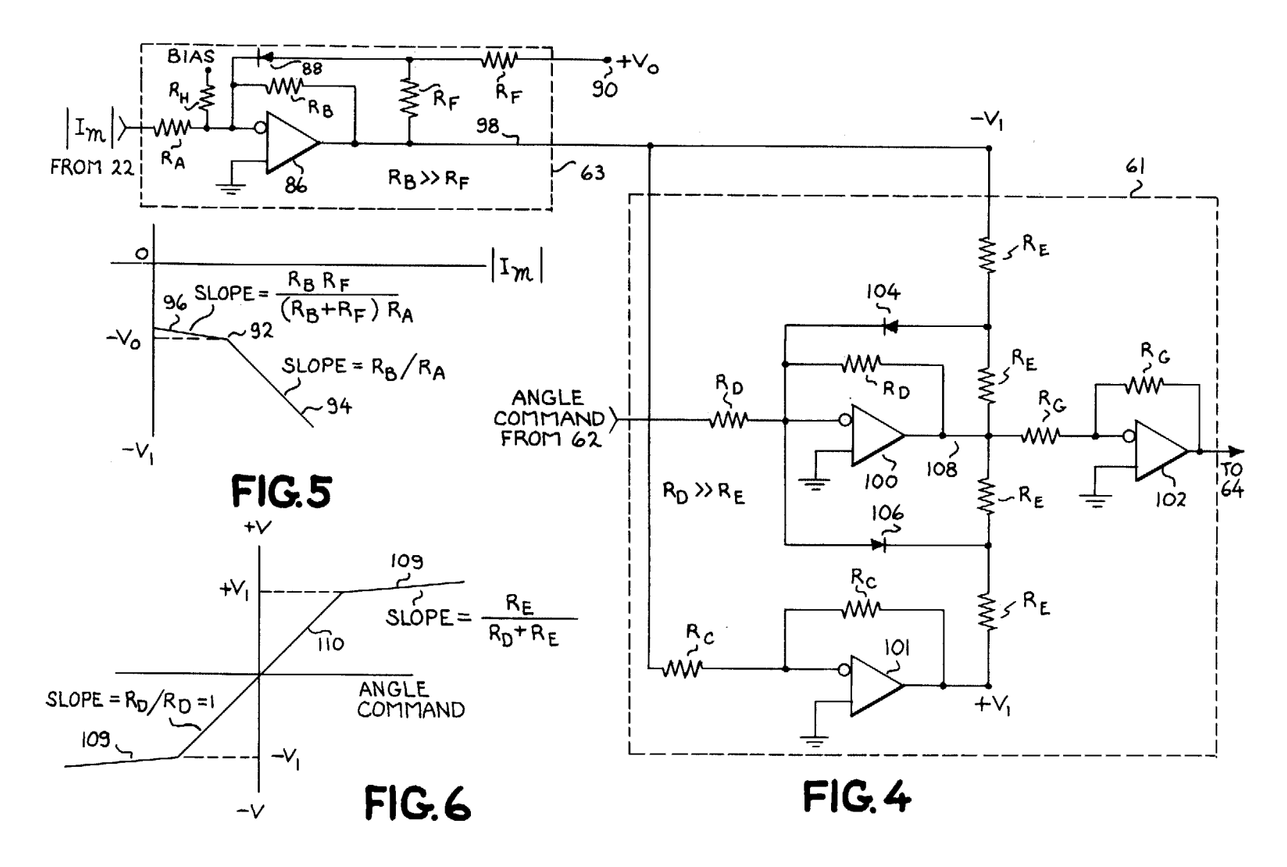
FIG. 4 is an electrical schematic illustrative of the electrical circuitry utilized to implement the angle command limit schedule shown in FIG. 2.
FIG. 5 is a diagram illustrative of the operational characteristic of a first portion of the circuitry shown in FIG. 4.
FIG. 6 is a diagram illustrative of the operational characteristic of a second portion of the circuitry shown in FIG. 4.

A particular embodiment of the circuitry utilized to implement the variable clamp 61 and the function generator 63 is shown in FIG. 4. Both circuits shown therein make use of circuit configurations composed of feedback limiters of the type shown and described in the textbook entitled *Operational Amplifiers* by Burr-Brown, McGraw-Hill, 1971, at pages 242-244 of chapter 7, entitled "Operational Amplifiers and Non-Linear Circuits." As such, function generator 63 includes an operational amplifier 86 having an input resistor $R_A$ which is adapted to input the signal $|I_M|$ from the block 22 to the inverting input of the operational amplifier 86. A first feedback loop consisting of resistor $R_B$ is directly coupled between the output and inverted input. A resistive voltage divider feedback circuit implemented by a pair of equal valued resistors $R_F$ and a diode 88 comprises a second feedback loop coupled to operational amplifier 86. With a $+V_o$ bias potential applied to terminal 90, and with $R_B$ much larger than $R_F$ an output characteristic from amplifier 86 such as shown in FIG. 5 results, with the break point 92 occurring when the voltage at 98 is equal to $+V_o$ but of opposite polarity.

At that point the diode 88 begins conduction. The slope of the characteristic curve portion 94 of FIG. 5 where the diode is nonconductive is equal to the value of $R_B/R_A$; however, in the limited region 96, the slope is equal to $R_BR_F/(R_B+R_F)R_A$. The extended intercept of segment 94 with the coordinates is determined by the value of the current in a resistor $R_H$ connected between a bias potential and the inverting input of amplifier 86. Thus as the magnitude of the absolute value of the motor current $I_M$ decreases, the voltage output $(-V_1)$ of operational amplifier 86 on circuit lead 98 of FIG. 4 moves toward zero until the break point 92 is reached, at which time a substantially constant value equal to $-V_o$ results.

The $-V_1$ signal appearing on circuit lead 98 comprises the control signal which is used as the level setting value for the variable clamp 61 which is implemented by a circuit including three operational amplifiers 100, 101 and 102, the first of which operates as a bipolar feedback limiter circuit coupled to a pair of inverters. The operational amplifier 101 acts to invert the signal $-V_1$ to $+V_1$ while operational amplifier 102 operates as an output signal inverter. Operational amplifier 100 includes an input resistor and a feedback resistor of equal value and hence are labeled $R_D$. The input resistor $R_D$ is coupled to the output of the multiplier 62 in FIG. 1 and applies the angle command to the inverting input of the operational amplifier 100. Two feedbacks loops including two pairs of equal valued resistors $R_E$ are coupled in series between variable bias potentials $-V_1$ and $+V_1$. Oppositely poled diodes 104 and 106 are connected from the common junction between the $R_E$ resistor pairs to the inverting input of operational amplifier 100 and become conductive when the signal level on output lead 108 equals $-V_1$ and $+V_1$, respectively, and thereby provide the output characteristic such as shown in FIG. 6. The break points occur at $+V_1$ and $-V_1$, as shown, with the slopes of the line segments 109 and 110 being determined by the same relationship of the resistor values as explained with reference to the first-mentioned feedback limiter; i.e., the slope of line segment 110 is equal to $R_D/R_D=1$ while the slope of the line segments 109 are equal to $R_E/R_D+R_E$ with $R_D$ much greater than $R_E$. Finally, the signal appearing on line 108 is inverted and applies to summing junction 64 of FIG. 1.

Thus for predetermined low values of motor current, the angle command to the inverter control circuitry 16 will be limited according to a predetermined schedule until a minimum value of angle is attained, at which time it will be maintained substantially constant at a value greater than zero for any further decrease in motor current. This operational characteristic of the system disclosed herein has particular applicability for load and speed changes where it is desirable and even necessary to prevent the motor flux from collapsing as a result of a change in torque reference.

In addition to the curve 82–84 just described, FIG. 3 shows two other curves illustrating other possible angle command limit schedules. Curve 122 shows an ideal schedule which implements the mathematical relationship:

$$\max \theta = \text{arc cos } \psi\min/(|I_M|\cdot X_M)$$

wherein:
max $\theta$ = scheduled angle limit,
$\psi$min = minimum level of flux desired,
$|I_M|$ = extant value of motor current, and
$X_M$ = magnetizing reactance of the motor.

Curve 120 shows a linear approximation of the ideal schedule 122 which, in many instances, will be sufficient to achieve desired results. Both curves 120 and 122 can be achieved by modification of the function generator 63 shown in FIG. 4 in accordance with the teachings of the previously referenced text entitled *Operational Amplifiers*.

While there has been shown and described what is at present considered to be the preferred embodiment of the present invention, modifications thereto will readily occur to those skilled in the art. It is not desired, therefore, that the invention be limited to the specific arrangement shown and described, but it is intended to cover in the appended claims all such modifications as fall within the true spirit and scope of the invention.

What is claimed is:

1. A control for an AC electric motor having a stator and a rotor spaced from the stator by a gap across which gap flux is produced in response to an electrical motor current of variable magnitude and frequency through windings associated with said stator, said control serving to control the electrical torque of said motor and comprising:
    (a) means to determine, with respect to the motor, the instantaneous electrical torque, the instantaneous motor current, and the instantaneous angle between the gap flux and the motor current and to provide signals proportional thereto;
    (b) means to establish a torque reference signal proportional to a desired level of electrical torque;
    (c) means responsive to said torque reference signal to generate a current error signal, said current error signal acting as the primary control parameter serving to vary the magnitude of the motor current;
    (d) means responsive substantially solely to said torque reference signal to derive an angle reference signal representative of the desired angle between the gap flux and the motor current;
    (e) means to compare said angle reference signal with said signal proportional to the instantaneous angle between the gap flux and motor current and to generate an angle error signal representative of any difference therebetween and effective to vary the frequency of the motor current and accordingly the angle between the gap flux and the motor current; and
    (f) means responsive to said instantaneous motor current to limit said angle reference signal to predetermined values as a function of motor current in the region of relatively low valued motor currents in relation to the motor's rated current value.

2. The invention in accordance with claim 1 wherein said predetermined values of limited angle reference signal are chosen to prevent the air gap flux from decreasing below a prescribed minimum when the motor current reaches relatively low values.

3. The invention in accordance with claim 1 wherein said predetermined values of limited angle reference signal are effected by said limiting means to maintain said angle at a substantially constant non-zero value to prevent the gap flux from collapsing on sudden changes of torque reference.

4. The invention in accordance with claim 3 wherein said non-zero value is less than the angle commanded in the normal operating range of the motor.

5. The invention in accordance with claim 3 wherein said substantially constant non-zero value is in the region of 44% of the motor's rated angle.

6. The invention in accordance with claim 3 wherein said substantially constant non-zero value of angle is substantially equal to arc cos 0.9 for a normal operating angle of arc cos 0.5.

7. The invention in accordance with claim 1 wherein said relatively low valued motor currents approach the value of current required to maintain a minimum value of gap flux.

8. The invention in accordance with claim 1 wherein said limiting means operates in a first range of low valued motor current to effect a varying angle limit of relatively low value compared to the motor's normal operating angle and in a second relatively lower range of low valued motor current to effect a substantially constant angle limit of minimum non-zero value compared to the motor's normal operating angle.

9. The invention in accordance with claim 8 wherein said first range of low valued motor current exists substantially between the limits of 0.4 and 0.25 of rated motor current and said second range of low valued motor current exists substantially between the limits of 0.25 and 0.0 of rated motor current.

10. The invention in accordance with claim 8 wherein said limiting means includes means for varying said angle substantially linearly with respect to motor current in said first range of low valued motor current.

11. The invention in accordance with claim 1 wherein the angle limit (max $\theta$) approximates the mathematical relationship defined by the expression:

$$\max \theta = \arccos \psi\min/(|I_M| \cdot X_M)$$

wherein $\psi\min$ is the minimum level of flux desired, $|I_M|$ is the extant value of motor current, and $X_M$ is the magnetizing reactance of the motor.

12. The invention in accordance with claim 1 wherein said last recited means comprises:
 (a) means responsive to said instantaneous motor current to generate said control signal in accordance with a predetermined limit schedule; and
 (b) means responsive to a control signal to produce a clamped angle reference signal at said low valued motor currents.

13. The invention in accordance with claim 1 and further including:
 (a) means to determine, with respect to the motor, the instantaneous gap flux and to provide a signal proportional thereto;
 (b) means responsive to said torque reference signal to establish a flux reference signal proportional to a desired gap flux;
 (c) means to compare said flux reference signal with said signal proportional to the instantaneous gap flux and to produce a flux error signal representative of any difference therebetween; and
 (d) means to modify the value of said angle reference signal as a function of said flux error signal.

14. The invention in accordance with claim 13 wherein said modifying means includes:
 (a) amplifying means, responsive to said flux error signal, to provide an output signal having a maximum value and a minimum value not less than zero; and
 (b) multiplying means responsive to the output of said amplifying means effective to modify the value of said angle reference signal, said multiplying means being coupled to said limiting means.

15. The invention in accordance with claim 1 further including:
 (a) means to determine, with respect to the motor, the instantaneous gap flux and to provide a signal proportional thereto;
 (b) means responsive to said torque reference signal to produce a flux reference signal proportional to a desired gap flux;
 (c) means to compare said flux reference signal with said signal proportional to the instantaneous gap flux and to produce a flux error signal representative of any difference therebetween; and
 (d) means to modify the value of said current error signal as a function of said flux error signal.

16. The invention in accordance with claim 1 further including:
 (a) means to determine, with respect to the motor, the instantaneous gap flux and to provide a signal proportional thereto;
 (b) means responsive to said torque reference signal to produce a flux reference signal proportional to a desired gap flux;
 (c) means to compare said flux reference signal with said signal proportional to the instantaneous gap flux and to produce a flux error signal representative of any difference therebetween; and
 (d) first and second modifying means each responsive to said flux error signal to modify, respectively, the values of said angle reference signal and said current error signal.

17. The invention in accordance with claim 1 further including means to modify the current error signal as a function of the absolute magnitude of the motor current.

18. The invention in accordance with claim 1 further including:
 (a) a variable DC current source for providing a DC output current which varies in response to said current error signal;
 (b) a source of variable frequency current for supplying current to said motor at a frequency which is a function of said angle error signal; and
 (c) link circuit means including an inductor for connecting said DC current source to said source of variable frequency current.

19. The invention in accordance with claim 1 further including:
 (a) means to produce an actual speed signal proportional to the instantaneous rotational speed of the motor; and wherein
 (b) means are included to combine said actual speed signal with the results of the comparison of the angle reference signal and the signal proportional to the instantaneous angle between the gap flux and the motor current to produce said angle error signal.

20. A method of driving an AC motor from a controlled power source supplying a current of variable magnitude and frequency to said motor comprising the steps of:
 (a) determining with respect to the motor, the instantaneous electrical torque, the instantaneous motor current, and the instantaneous angle between the gap flux and the motor current and providing signals proportional thereto;

(b) establishing a torque reference signal proportional to a desired level of electrical torque;

(c) comparing said torque reference signal with said signal proportional to the instantaneous electrical torque and generating a current error signal representative of any difference therebetween, said current error signal acting as the primary control parameter serving to vary the magnitude of the motor current;

(d) deriving an angle reference signal representative of the desired angle between the gap flux and the motor current in response substantially solely to said torque reference signal;

(e) comparing said angle reference signal with said signal proportional to the instantaneous angle between the gap flux and motor current and generating an angle error signal representative of any difference therebetween, said angle error signal being effective to vary the frequency of the motor current and accordingly the angle between the gap flux and the motor current; and (f) limiting said angle reference signal to a predetermined value as a function of instantaneous motor current in the region of relatively low valued motor currents.

21. The method in accordance with claim 20 wherein said predetermined values of limited angle reference signal in said limiting step are chosen to prevent the air gap flux from decreasing below a prescribed minimum when the motor current reaches relatively low values and thereby prevent the collapse of gap flux as the motor current approaches a no load value.

22. The method of claim 20 wherein said limiting step comprises clamping said angle error to a substantially constant value.

23. The method of claim 22 wherein said substantially constant value comprises a non-zero value.

24. The method in accordance with claim 20 wherein the limit imposed upon the value of the angle reference signal approximates a mathematical relationship as defined by the expression:

$$\max \theta = \arc\cos \psi_{min}/(|I_M| \cdot X_M)$$

wherein max $\theta$ is scheduled angle limit, $\psi_{min}$ is the minimum level of flux desired, $|I_M|$ is the extant value of motor current and $X_M$ is the magnetizing reactance of the motor.

* * * * *